(12) United States Patent
Katata (10) Patent No.: US 8,456,970 B2
(45) Date of Patent: Jun. 4, 2013

(54) INFORMATION RECORDING APPARATUS, INFORMATION RECORDING METHOD, AND INFORMATION RECORDING/PROCESSING PROGRAM

(75) Inventor: Keiji Katata, Saitama (JP)

(73) Assignee: Pioneer Corporation, Kanagawa (JP)

( * ) Notice: Subject to any disclaimer, the term of this patent is extended or adjusted under 35 U.S.C. 154(b) by 0 days.

(21) Appl. No.: 13/392,339

(22) PCT Filed: Aug. 26, 2009

(86) PCT No.: PCT/JP2009/064868
§ 371 (c)(1),
(2), (4) Date: Feb. 24, 2012

(87) PCT Pub. No.: WO2011/024265
PCT Pub. Date: Mar. 3, 2011

(65) Prior Publication Data
US 2012/0155244 A1 Jun. 21, 2012

(51) Int. Cl.
*G11B 21/08* (2006.01)
(52) U.S. Cl.
USPC ...................................... 369/30.04; 369/53.2
(58) Field of Classification Search
None
See application file for complete search history.

(56) References Cited

U.S. PATENT DOCUMENTS

| 2002/0004884 A1 | 1/2002 | Yamakawa et al. |
| 2006/0158979 A1 | 7/2006 | Nakamura et al. |
| 2008/0123490 A1 | 5/2008 | Ogawa et al. |

FOREIGN PATENT DOCUMENTS

| JP | 06-231531 | 8/1994 |
| JP | 09-320204 | 12/1997 |
| JP | 11-213548 | 8/1999 |
| JP | 2000-215613 | 8/2000 |
| JP | 2005-004912 | 1/2005 |
| JP | 2007-179666 | 7/2007 |
| JP | 2007-200417 | 8/2007 |
| WO | WO 2005/029492 | 3/2005 |

OTHER PUBLICATIONS

International Search Report, PCT/JP2009/064868, Nov. 10, 2009.

*Primary Examiner* — Paul Huber
(74) *Attorney, Agent, or Firm* — Young & Thompson (57) ABSTRACT

An information recording apparatus recording disc structure definition information defining a structure of an optical disc, in management areas of the optical disc including a data area and the management areas positioned on inner and outer periphery sides of the data area, includes: a memory which stores disc structure definition information of a new version including an invalid mark which cannot be interpreted as the disc structure definition information by an information reproducing apparatus and an information recording/reproducing apparatus being non-adaptive; and a recording control element for, when the disc structure definition information of the new version is recorded in the management areas, controlling recording of the disc structure definition information of the new version so the invalid mark is positioned at a position in the management areas in which all or part of disc structure definition information of an old version without the invalid mark needs to be recorded.

8 Claims, 6 Drawing Sheets

NEW VERSION DDS

| BYTE POSITION | NUMBER OF BYTES | NAME | CONTENT |
|---|---|---|---|
| 0 | 96 | Invalid Mark | INVALID MARK (all 0) |
| 96 | 2 | Identifier | DISC STRUCTURE DEFINITION INFORMATION IDENTIFIER |
| 98 | 1 | Format | DISC STRUCTURE DEFINITION INFORMATION VERSION |
| 99 | 1 | unused | UNUSED |
| 100 | 4 | Counter | UPDATE COUNTER |
| 104 | 8 | unused | UNUSED |
| 112 | 4 | Information# 1 | #1 Physical Sector Number OF INFORMATION RECORDING POSITION |
| 116 | 4 | unused | UNUSED |
| 120 | 4 | Defect List PSN | Physical Sector Number OF DEFECT MANAGEMENT INFORMATION |
| 124 | 4 | unused | UNUSED |
| 128 | 4 | User Data Area start PSN | Physical Sector Number OF RECORDING START POSITION IN USER DATA AREA |
| 132 | 4 | User Data Area end PSN | Physical Sector Number OF RECORDING END POSITION IN USER DATA AREA |
| 136 | 4 | SA#1 size | #1 SPARE AREA SIZE |
| 140 | 4 | SA#2 size | #2 SPARE AREA SIZE |
| 144 | 4 | SA#3 size | #3 SPARE AREA SIZE |
| 145 | 1 | Status #1 | #1 STATUS FLAG |
| 146 | 1 | unused | UNUSED |
| 147 | 1 | Status #2 | #2 STATUS FLAG |
| 148 | 1 | unused | UNUSED |
| 152 | 4 | Work#1 PSN | #1 Physical Sector Number OF WORKING POSITION |
| 156 | 4 | unused | UNUSED |
| 160 | 8 | Status #3 | #3 STATUS FLAG |
| 168 | 8 | Status #4 | #4 STATUS FLAG |
| 176 | 8 | Status #5 | #5 STATUS FLAG |
| 184 | 8 | Status #6 | #6 STATUS FLAG |
| 192 | 65344 | unused | UNUSED |

OLD VERSION DDS

| BYTE POSITION | NUMBER OF BYTES | NAME | CONTENT |
|---|---|---|---|
| 0 | 2 | Identifier | DISC STRUCTURE DEFINITION INFORMATION IDENTIFIER |
| 2 | 1 | Format | DISC STRUCTURE DEFINITION INFORMATION VERSION |
| 3 | 1 | unused | UNUSED |
| 4 | 4 | Counter | UPDATE COUNTER |
| 8 | 8 | unused | UNUSED |
| 16 | 4 | Infomation# 1 | #1 Physical Sector Number OF INFORMATION RECORDING POSITION |
| 20 | 4 | unused | UNUSED |
| 24 | 4 | Defect List PSN | Physical Sector Number OF DEFECT MANAGEMENT INFORMATION |
| 28 | 4 | unused | UNUSED |
| 32 | 4 | User Data Area start PSN | Physical Sector Number OF RECORDING START POSITION IN USER DATA AREA |
| 26 | 4 | User Data Area end PSN | Physical Sector Number OF RECORDING END POSITION IN USER DATA AREA |
| 40 | 4 | SA#1 size | #1 SPARE AREA SIZE |
| 44 | 4 | SA#2 size | #2 SPARE AREA SIZE |
| 48 | 4 | SA#3 size | #3 SPARE AREA SIZE |
| 52 | 1 | Status #1 | #1 STATUS FLAG |
| 53 | 1 | unused | UNUSED |
| 54 | 1 | Status #2 | #2 STATUS FLAG |
| 55 | 1 | unused | UNUSED |
| 56 | 4 | Work#1 PSN | #1 Physical Sector Number OF WORKING POSITION |
| 60 | 4 | unused | UNUSED |
| 64 | 8 | Status #3 | #3 STATUS FLAG |
| 72 | 8 | Status #4 | #4 STATUS FLAG |
| 80 | 8 | Status #5 | #5 STATUS FLAG |
| 88 | 8 | Status #6 | #6 STATUS FLAG |
| 96 | 65440 | unused | UNUSED |

FIG.3

NEW VERSION DDS

| BYTE POSITION | NUMBER OF BYTES | NAME | CONTENT |
|---|---|---|---|
| 0 | 96 | Invalid Mark | INVALID MARK (all 0) |
| 96 | 2 | Identifier | DISC STRUCTURE DEFINITION INFORMATION IDENTIFIER |
| 98 | 1 | Format | DISC STRUCTURE DEFINITION INFORMATION VERSION |
| 99 | 1 | unused | UNUSED |
| 100 | 4 | Counter | UPDATE COUNTER |
| 104 | 8 | unused | UNUSED |
| 112 | 4 | Infomation# 1 | #1 Physical Sector Number OF INFORMATION RECORDING POSITION |
| 116 | 4 | unused | UNUSED |
| 120 | 4 | Defect List PSN | Physical Sector Number OF DEFECT MANAGEMENT INFORMATION |
| 124 | 4 | unused | UNUSED |
| 128 | 4 | User Data Area start PSN | Physical Sector Number OF RECORDING START POSITION IN USER DATA AREA |
| 132 | 4 | User Data Area end PSN | Physical Sector Number OF RECORDING END POSITION IN USER DATA AREA |
| 136 | 4 | SA#1 size | #1 SPARE AREA SIZE |
| 140 | 4 | SA#2 size | #2 SPARE AREA SIZE |
| 144 | 4 | SA#3 size | #3 SPARE AREA SIZE |
| 145 | 1 | Status #1 | #1 STATUS FLAG |
| 146 | 1 | unused | UNUSED |
| 147 | 1 | Status #2 | #2 STATUS FLAG |
| 148 | 1 | unused | UNUSED |
| 152 | 4 | Work#1 PSN | #1 Physical Sector Number OF WORKING POSITION |
| 156 | 4 | unused | UNUSED |
| 160 | 8 | Status #3 | #3 STATUS FLAG |
| 168 | 8 | Status #4 | #4 STATUS FLAG |
| 176 | 8 | Status #5 | #5 STATUS FLAG |
| 184 | 8 | Status #6 | #6 STATUS FLAG |
| 192 | 65344 | unused | UNUSED |

INFORMATION RECORDING APPARATUS, INFORMATION RECORDING METHOD, AND INFORMATION RECORDING/PROCESSING PROGRAM

This application is a 371 of PCT/JP2009/064868, filed Aug. 26, 2009.

TECHNICAL FIELD

The present invention relates to a field of a technique of recording disc structure definition information for defining a structure of an optical disc in disc management areas of the optical disc including a data area and the management areas on an inner periphery side and an outer periphery side of the data area.

BACKGROUND ART

Conventionally, optical discs of a high density such as DVDs (Digital Versatile Discs) and BDs (Blu-ray Discs) are known as replacable recording media of a large volume. Management areas (generally referred to as "defect management areas" or "disc management areas") provided on an inner periphery side and an outer periphery side of an optical disc of this type record disc structure definition information (DDS (Disc Definition Structure)) for defining an optical disc structure (see, for example, Patent Document 1).

This disc structure definition information (hereinafter, "DDS") is indispensable for a device (apparatus) to record information in an optical disc or reproduce information from an optical disc.

In some cases, part of a data recording configuration (such as a recording configuration of user data or an application data format) on a disc is changed upon designation of a new optical disc format. However, conventional reproducing devices which do not support a data recording configuration including partially changed content has a problem that reproduction becomes unstable. For example, conventional reproducing devices of some firmware versions sometimes can reproduce and sometimes cannot reproduce information from an optical disc of a partially changed data recording configuration. Further, even if information can be reproduced from an optical disc, reproduction is stopped in some cases upon, for example, an access to a partially changed portion of the structure. Further, conventional recording devices which do not support optical discs including partially changed content have a concern of destruction of an optical disc, which records a partially changed data recording configuration, due to error recording.

The above unstable access that causes unstable reproduction or error recording is a factor for returns or complaints of optical discs and devices for manufacturers or distributors, and needs to be prevented.

To prevent this unstable access, a method is introduced of acquiring and checking in a device a disc ID (a disc ID which varies per optical disc format) or a disc type determination information recorded in an optical disc in advance, when an optical disc is not supported, presenting information about this to a user and preventing reproduction and recording of information.

PRIOR ART DOCUMENTS

Patent Document

Patent Document 1: Japanese Patent Application Laid-Open No. 2007-200417

SUMMARY OF THE INVENTION

Problems to be Solved by the Invention

However, special reproducing devices such as game instruments using optical discs perform processing of reading user data recorded in a data area of an optical disc without acquiring and checking a disc ID or disc type determination information to reduce a start-up time as much as possible. Hence, a method of having a device check a disc ID or disc type determination information supporting a new optical disc format has a problem that the new optical disc cannot prevent the above unstable access.

The present invention has a task to solve this problem, and it is therefore an object of the present invention to provide an information recording apparatus, an information recording method, an information recording/processing program, an information reproducing apparatus and an optical disc which can block an unstable access through a new optical disc.

Means for Solving the Problems

In order to solve the above problem, the invention according to one embodiment is an information recording apparatus which records disc structure definition information for defining a structure of an optical disc, in management areas of the optical disc comprising a data area and the management areas positioned on an inner periphery side and an outer periphery side of the data area, the information recording apparatus comprising:

a memory which stores disc structure definition information of a new version comprising an invalid mark which cannot be interpreted as the disc structure definition information by an information reproducing apparatus and an information recording/reproducing apparatus being non-adaptive; and recording control means for, when the disc structure definition information of the new version is recorded in the management areas, controlling recording of the disc structure definition information of the new version such that the invalid mark is positioned at a position in the management areas in which all or part of disc structure definition information of an old version without the invalid mark needs to be recorded.

The invention according to another embodiment is an optical disc comprising a data area and management areas positioned on an inner periphery side and an outer periphery side of the data area and recording disc structure definition information for defining a structure of the optical disc, wherein in the management areas, disc structure definition information of a new version comprising an invalid mark which cannot be interpreted as the disc structure definition information by an information reproducing apparatus and an information recording/reproducing apparatus being non-adaptive are recorded; and the invalid mark is recorded at a position in the management areas in which all or part of disc structure definition information of an old version without the invalid mark needs to be recorded.

The invention according to a further embodiment is an information recording method for recording disc structure definition information for defining a structure of an optical disc, in management areas of the optical disc comprising a data area and the management areas positioned on an inner periphery side and an outer periphery side of the data area, the information recording method comprising:

a step of storing disc structure definition information of a new version comprising an invalid mark which cannot be interpreted as the disc structure definition information by an information reproducing apparatus and an information recording/reproducing apparatus being non-adaptive; and a step of, when the disc structure definition information of the new version is recorded in the management areas, controlling recording of the disc structure definition information of the new version such that the invalid mark is positioned at a position in the management areas in which all or part of disc structure definition information of an old version without the invalid mark needs to be recorded.

The invention according to a different embodiment is an information recording/processing program causing a computer which records disc structure definition information for defining a structure of an optical disc, in management areas of the optical disc comprising a data area and the management areas positioned on an inner periphery side and an outer periphery side of the data area, to:

store disc structure definition information of a new version comprising an invalid mark which cannot be interpreted as the disc structure definition information by an information reproducing apparatus and an information recording/reproducing apparatus being non-adaptive; and when the disc structure definition information of the new version is recorded in the management areas, control recording of the disc structure definition information of the new version such that the invalid mark is positioned at a position in the management areas in which all or part of disc structure definition information of an old version without the invalid mark needs to be recorded.

MODES FOR CARRYING OUT THE INVENTION

Hereinafter, an embodiment of the present invention will be described based on the accompanying drawings. In addition, the embodiment described below is an embodiment where the present invention is applied to an information recording/reproducing apparatus which records information in a disc-shaped optical disc and reproduces information from the optical disc.

(1. Optical Disc Structure)

First, an optical disc structure according to an embodiment of the present invention will be described with reference to FIG. 1. In addition, a rewritable blue-ray disc (BD-RE) will be employed as an example of an optical disc according to the present embodiment.

Figure 1A:
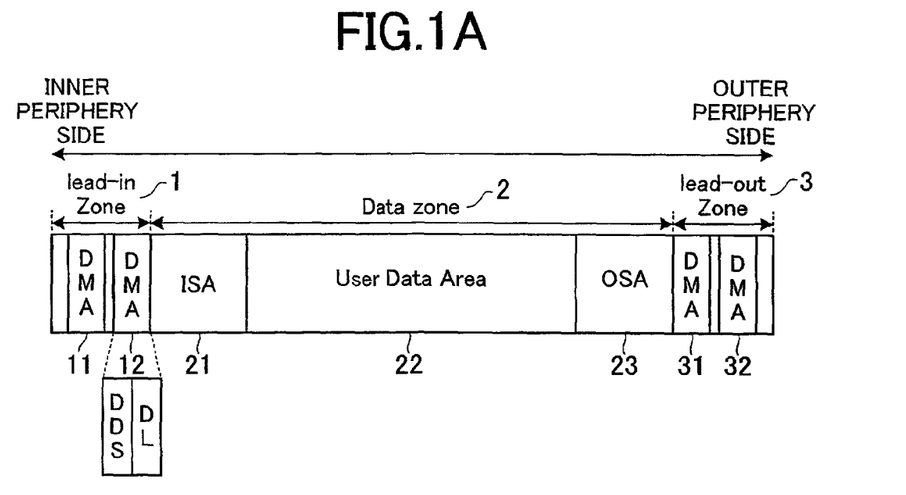
FIG. 1A is a view illustrating an optical disc structure of a single layer.
Figure 1B:
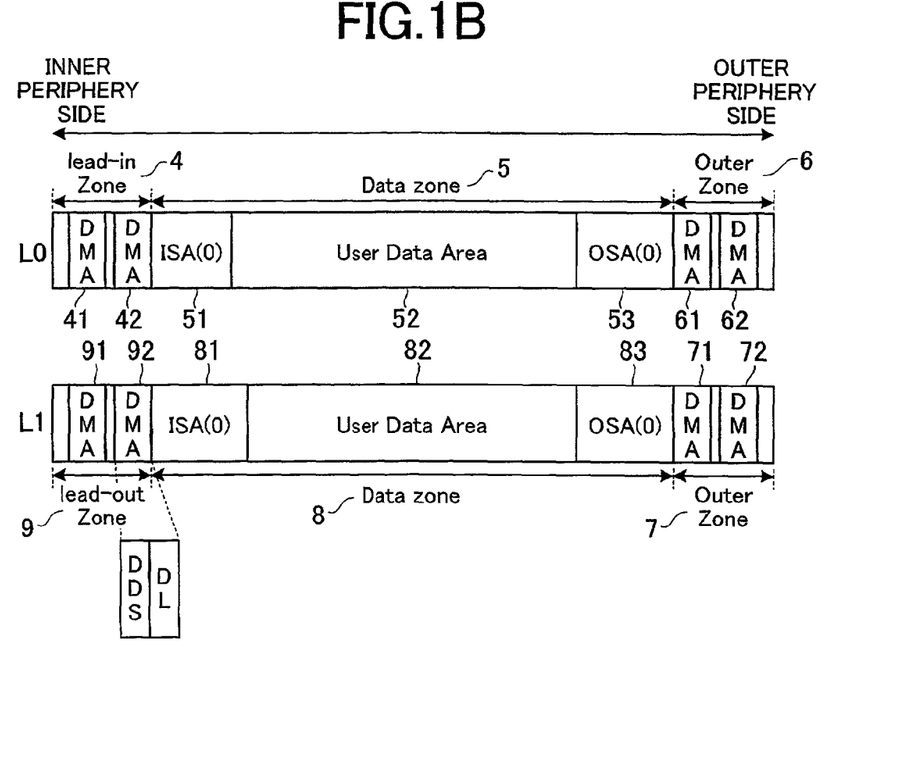
FIG. 1B is a view illustrating an optical disc structure of a dual layer.

FIG. 1A is a view illustrating an optical disc structure of a single layer, and FIG. 1B is a view illustrating an optical disc structure of a dual layer.

The single layer optical disc illustrated in FIG. 1A has a lead-in zone 1, a data zone 2 of a data area and a lead-out zone 3 from an inner periphery to an outer periphery direction of the optical disc.

The data zone 2 is partitioned into an ISA (Inner Spare Area) 21, a user data area 22 and an OSA (Outer Spare Area) 23.

The user data area 22 is an area in which user can record arbitrary information (user data) such as audio data, video data, text data or computer data.

The ISA 21 and the OSA 23 are substitution areas which record data for a given block in the user data area 22, and are used as substitution areas for this block when, for example, a defect block is detected in the user data area 22.

The lead-in zone 1 is positioned closer to the inner periphery than the data zone 2, and the lead-out zone 3 is positioned closer to the outer periphery than the data zone 2. The lead-in zone 1 includes a DMA (Disc Management Area) 11 and a DMA 12 which are management areas. Further, the lead-out zone 3 also includes a DMA 31 and a DMA 32. Further, a DDS which defines an optical disc structure and a DL (Defect List) which is defect management information related to a defect of the optical disc are recorded in each of the DMAs 11, 12, 31 and 32. That is, the single layer optical disc illustrated in FIG. 1A records four DDSs and four DLs of the same content. In addition, a DL includes information such as a position of a defect block and a position in a substitution area for this defect block.

By contrast with this, the dual layer optical disc illustrated in FIG. 1B includes two recording layers of a layer L0 and a layer L1. The layer L0 has a lead-in zone (also referred to as an "inner zone") 4, a data zone 5 and an outer zone 6 from the inner periphery to the outer periphery direction of the optical disc. The layer L1 has an outer zone 7, a data zone 8 and a lead-out zone (also referred to as an "inner zone") 9 from the outer periphery to the inner periphery direction of the optical disc. In addition, configurations of the data zone 5 and the data zone 8 are the same as the data zone 2.

In the layer L0, the lead-in zone 4 is positioned closer to the inner periphery than the data zone 5, and the outer zone 6 is positioned closer to the outer periphery than the data zone 5. The lead-in zone 4 includes a DMA 41 and a DMA 42. Further, the outer zone 6 also includes a DMA 61 and a DAM 62.

Furthermore, in the layer L1, the lead-out zone 9 is positioned closer to the inner periphery than the data zone 8, and the outer zone 7 is positioned closer to the outer periphery than the data zone 8. The lead-out zone 9 includes a DMA 91 and a DMA 92. Further, the outer zone 7 also includes a DMA 71 and a DMA 72. Furthermore, a DDS and a DL are recorded in each of the DMAs 41, 42, 61, 62, 71, 72, 91 and 92. That is, the dual layer optical disc illustrated in FIG. 1B records eight DDSs and eight DLs of the same content.

In addition, a PSN (Physical Sector Number) which is position information (physical address) is allocated on the recording layer of the optical disc in sector units. With the single layer optical disc, the PSN is allocated in an ascending order from the inner periphery to the outer periphery of the disc. By contrast with this, with the dual layer optical disc, the PSN is allocated in the ascending order from the inner periphery to the outer periphery of the disc in the layer L0, and the PSN is allocated in the ascending order from the outer periphery to the inner periphery of the disc in the layer L1.

(2. DDS Configuration)

Next, a new version DDS configuration according to the present embodiment will be described in comparison with a conventional old version DDS configuration with reference to FIGS. 2 and 3.

Figure 2:
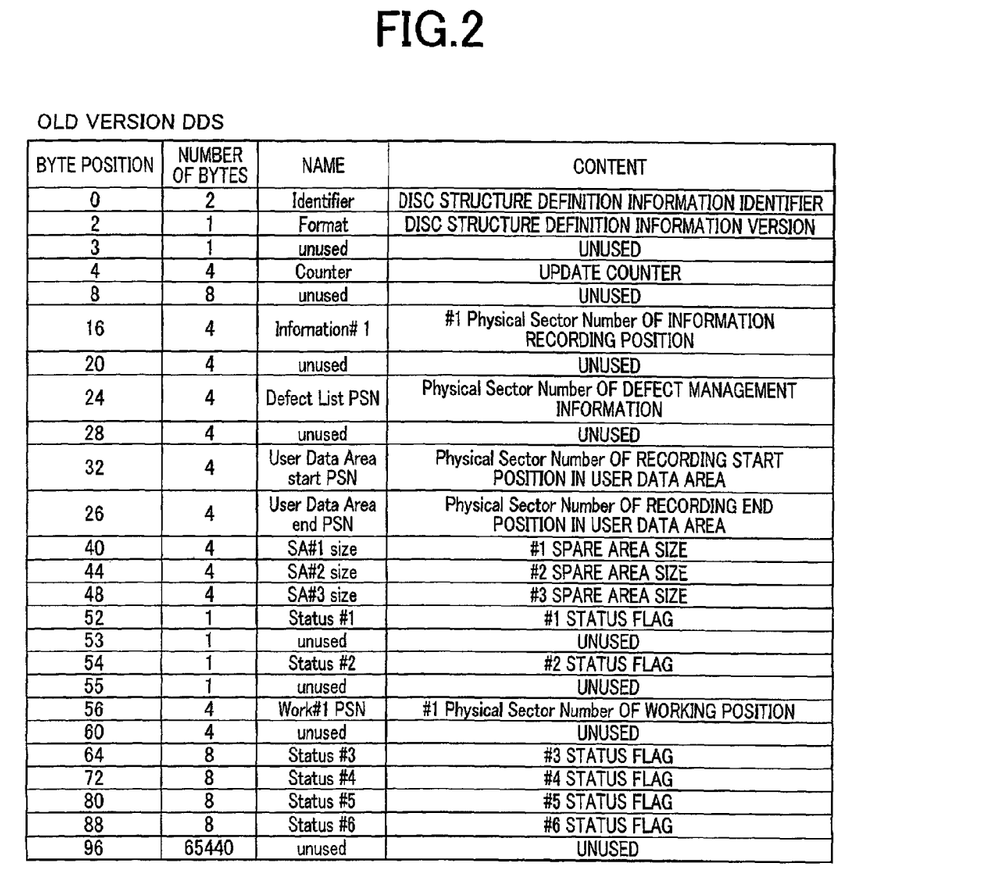
FIG. 2 is a view illustrating a configuration example of an old version DDS.
Figure 3:
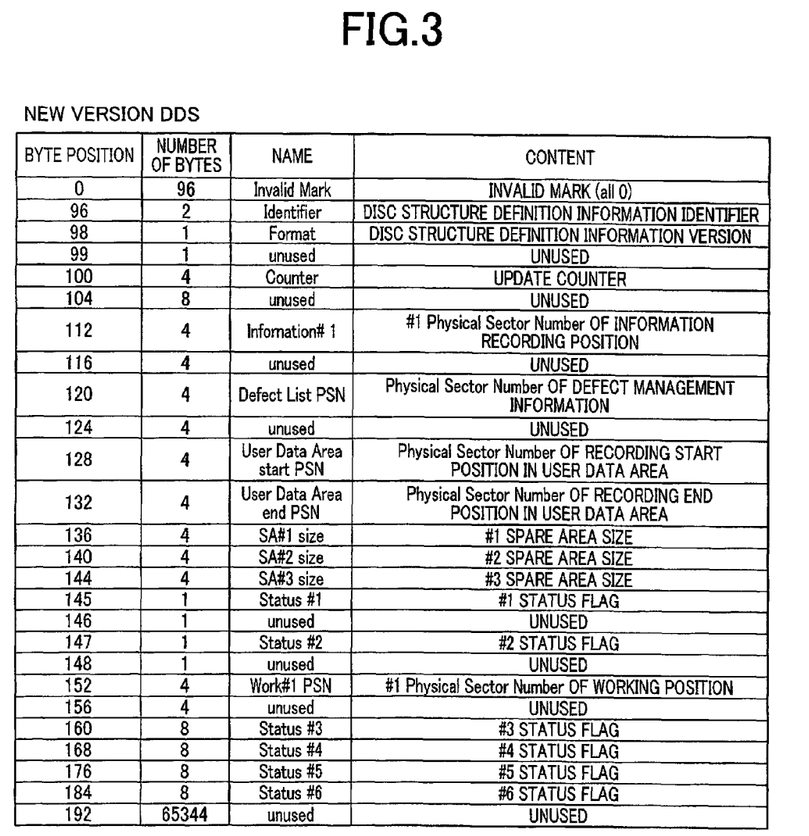
FIG. 3 is a view illustrating a configuration example of a new version DDS.

FIG. 2 is a view illustrating a configuration example of the old version DDS, and FIG. 3 is a view illustrating a configuration example of the new version DDS. In addition, a byte position "16" ("Information #1") illustrated in FIG. 2 is a location for recording a name of a recording apparatus and a recording performance adjusted value (for example, an adjusted value of Write Strategy).

In the old version DDS illustrated in FIG. 2, particularly a PSN (byte position "24") indicating a recording position of a DL which is defect management information and a PSN (byte position "32") indicating a recording start position in a user data area (data in the user data area) are indispensable information for the information reproducing apparatus to reproduce information from the optical disc.

Further, in the new version DDS illustrated in FIG. 3, invalid marks (for example, all data of "0") are defined for byte positions "0" to "95" in the old version DDS illustrated in FIG. 2. This invalid mark is information which cannot be interpreted as a DDS by an information reproducing apparatus (for example, a special reproducing device such as a game instrument) and an information recording/reproducing apparatus which do not support the new version DDS. Hence, when this new version DDS is recorded in a DMA of an optical disc, the information reproducing apparatus and the information recording/reproducing apparatus which do not support the new version DDS will recognize this optical disc as an invalid disc (for example, an unformatted or unused disc). Particularly, with the old version DDS, byte positions in which a PSN indicating a recording position of a DL and a PSN indicating a recording start position in the user data area need to be allocated (listed) are defined by invalid marks with the new version DDS (for example, byte positions which record the PSNs with the old version DDS are filled with 0), and therefore the information reproducing apparatus and the information recording/reproducing apparatus which do not support the new version DDS cannot read data from the data zone of the optical disc or write data in the data zone.

(3. Configuration and Operation of Information Recording/Reproducing Apparatus Supporting New Version DDS)

Next, a configuration of the information recording reproducing apparatus which supports the new version DDS will be described with reference to FIG. 4.

Figure 4:
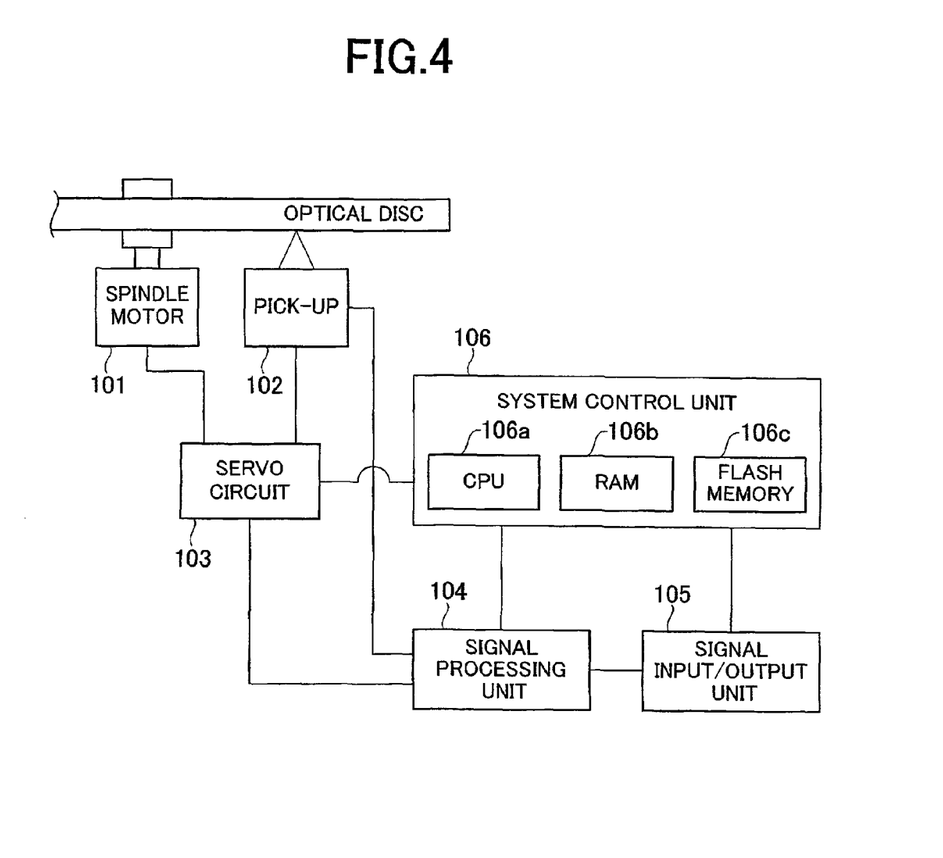
FIG. 4 is a view illustrating a schematic configuration example of an information recording/reproducing apparatus.

FIG. 4 is a view illustrating a schematic configuration example of the information recording/reproducing apparatus.

As illustrated in FIG. 4, the information recording/reproducing apparatus employs a configuration including a spindle motor 101, a pick-up 102, a servo circuit 103, a signal processing unit 104, a signal input/output unit 105, and a system control unit 106 (an example of a computer).

The spindle motor 101 rotates the optical disc set in the information recording/reproducing apparatus at a predetermined rotation speed. The pick-up 102 radiates laser light on the optical disc, and writes information in the optical disc or reads information from the optical disc. The servo circuit 103 performs driving control of the spindle motor 101, and tracking control and focus control of the pick-up 102. The signal processing unit 104 performs recording processing of, for example, modulating information (recording data) to be supplied to the pick-up 102, and reproducing processing of demodulating, decoding and error-correcting information (RF signal) read by the pick-up 102. The signal input/output unit 105 performs processing of receiving an input (for example, an input from an external device) of recording data to be supplied to the signal processing unit 104, and processing of outputting a signal (for example, to a speaker and a display) reproduced by the signal processing unit 104.

The system control unit 106 has, for example, a CPU (Central Processing Unit) 106a, a RAM (Random Access Memory) 106b, and a flash memory 106c, and controls the servo circuit 103, the signal processing unit 104 and the signal input/output unit 105. The flash memory 106c stores a program (including a firmware supporting the new version DDS (such as an information recording/processing program)) required for the above control executed by the CPU 106a, and data (including information of new version DDSs and DLs). Further, the flash memory 106c stores a correspondence table indicating a correspondence between a disc ID and a DDS version.

Furthermore, when the new version DDS is recorded in the DMAs provided on the inner periphery side and the outer periphery side of the optical disc (for example, when the optical disc is formatted), the system control unit 106 which is recording control means controls recording of the new version DDS such that invalid marks are positioned at positions of the DMAs in which all or part of the old version DDS without the invalid marks need to be recorded are positioned. Meanwhile, all of the DDS refers to, for example, information of byte positions "0" to "88" in the example illustrated in FIG. 2. Further, the part of the DDS refers to, for example, a PNS indicating a recording position of a DL and a PSN indicating a recording start position in the user data area which are indispensable to reproduce information from the optical disc in the example illustrated in FIG. 2.

When information is reproduced in this way from the optical disc in which the new version DDS is recorded, the system control unit 106 which is acquiring means controls the servo circuit 103 and the pick-up 102, accesses the DMA of the optical disc (seek operation), and acquires the new version DDS (read). Furthermore, the system control unit 106 which is reproduction control means controls reproduction of information recorded in the optical disc based on the acquired DDS except an invalid mark. For example, without interpreting the invalid mark included in the read new version DDS, the system control unit 106 interprets subsequent valid information (byte position "96" . . . with the example illustrated in FIG. 3), and controls reproduction of data recorded in the data zone of the optical disc. In addition, this reproduction control is applicable in an information reproducing apparatus dedicated for reproduction in the same fashion.

Further, when information is recorded in the optical disc in which the new version DDS is recorded, the system control unit 106 which is acquiring means controls the servo circuit 103 and the pick-up 102 to access a DMA of the optical disc (seek operation) and acquire the new version DDS. Further, the system control unit 106 which is recording control means controls recording of information in the optical disc based on the DDS except an invalid mark. For example, without interpreting the invalid mark included in the read new version DDS, the system control unit 106 interprets subsequent valid information (byte position "96" . . . with the example illustrated in FIG. 3), and controls recording of data recorded in the data zone of the optical disc.

Next, an operation of the information recording/reproducing apparatus which supports the new version DDS will be described with reference to FIG. 5.

Figure 5:
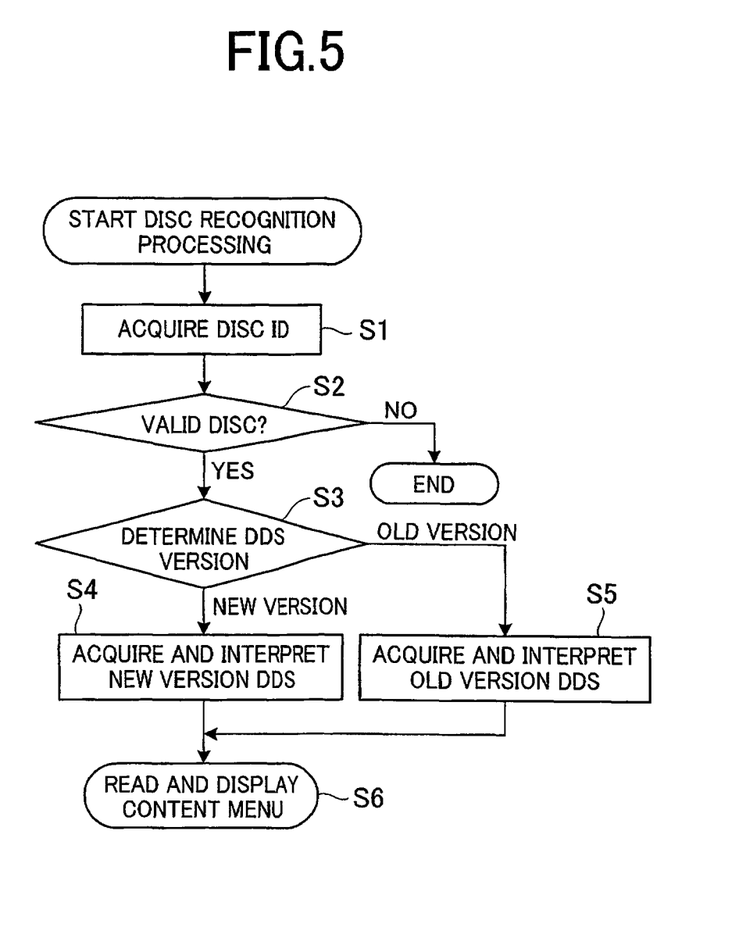
FIG. 5 is a flowchart illustrating processing of a system control unit 106 in the information recording/reproducing apparatus which supports the new version DDS.

FIG. 5 is a flowchart illustrating processing of the system control unit 106 in the information recording/reproducing apparatus which supports the new version DDS.

When the optical disc is set in the information recording/reproducing apparatus and disc recognition processing is started, the system control unit 106 controls the servo circuit 103 and the pick-up 102 to acquire a disc ID (or disc type determination information) recorded in the optical disc (step S1).

Next, the system control unit 106 determines whether or not the optical disc is supported, based on the acquired disc ID (or disc type determination information) (step S2). Further, when the optical disc is not supported (for example, a non-standard optical disc) (step S2: NO), the system control unit 106 outputs this message to a display and finishes this processing. By contrast with this, when the disc is supported (step S2: YES), the step proceeds to step S3.

In step S3, the system control unit 106 determines whether the DDS version recorded in the optical disc is a new version or an old version, based on the acquired disc ID and the correspondence table stored in the flash memory 106c. Further, when the DDS version is new (step S3: new version), the system control unit 106 acquires the new version DDS from the optical disc, and interprets the new version DDS as described above (step S4). By contrast with this, when the DDS version is old (step S3: old version), the system control unit 106 acquires the old version DDS from the optical disc and interprets the old version DDS (step S5).

Thus, when interpreting the DDS and recognizing the optical disc structure, the system control unit 106 reads and displays a content menu (step S6). When this content menu is displayed, processing transitions to reproduction processing or recording processing of information according to user's operation command.

(4. Operation of Information Reproducing Apparatus which does Not Support New Version DDS)

Next, an operation of an information reproducing apparatus (for example, a special reproducing device such as game instrument) which does not support the new version DDS will be described with reference to FIG. 6.

Figure 6:
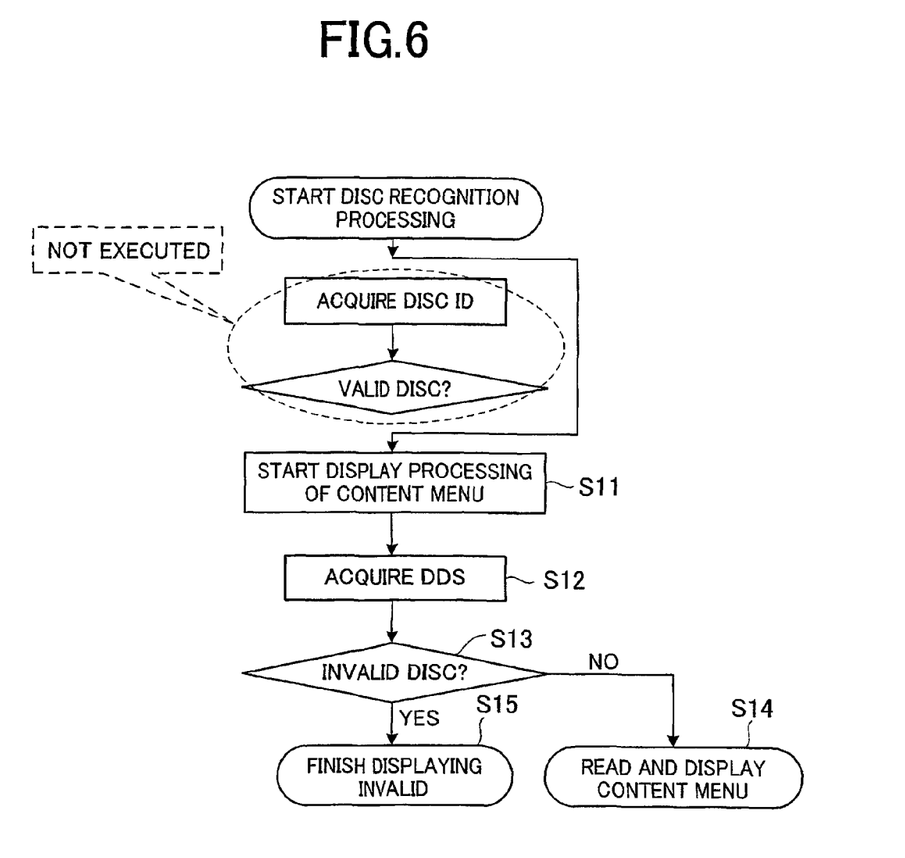
FIG. 6 is a flowchart illustrating processing of the system control unit 106 in the information reproducing apparatus which does not support the new version DDS.

FIG. 6 is a flowchart illustrating processing of the system control unit 106 in the information reproducing apparatus which does not support the new version DDS. In addition, this processing is also the same as in the information recording/reproducing apparatus which does not support the new version DDS.

As illustrated in FIG. 6, after disc recognition processing starts, the information reproducing apparatus directly transitions to step S11 and starts display processing of the content menu without performing processing corresponding to step S1 and step S2 illustrated in FIG. 5, and acquires the DDS from the optical disc (step S12). When the acquired DDS is the old version, the information reproducing apparatus which does not support the new version DDS can interpret the DDS, and then decides that the optical disc is not an invalid disc (step S13: NO) and reads and displays the content menu (step S14). However, when the acquired DDS is the new version, as described above, the information reproducing apparatus which does not support the new version DDS cannot interpret this DDS, and then decides that the optical disc is an invalid disc (for example, unused disc) (step S13: YES), outputs a message of this (display invalid) and finishes (stop) this processing (step S15).

As described above, with the above embodiment, the new version DDS is configured to be recorded such that invalid marks are positioned at positions of DMAs of the optical disc in which the old version DDS needs to be recorded, so that, even when performing processing of reading user data recorded in a data area of the optical disc, the information reproducing apparatus (for example, a special reproducing device such as a game instrument) or the information recording reproducing apparatus which does not support the new version DDS can recognize that the optical disc which records the new version DDS is an invalid disc without acquiring or checking a disc ID or disc type determination information and, consequently, block an unstable access through the optical disc. By contrast with this, the information reproducing apparatus or the information recording/reproducing apparatus which supports the new version DDS can reliably record or reproduce information in the optical disc which records the new version DDS.

In addition, as described above, although all invalid marks are preferably data of "0", if the information reproducing apparatus which does not support the new version DDS cannot interpret this DDS, all invalid marks may be data of "1".

Further, although, with the new version DDS illustrated in FIG. 3 in the above embodiment, invalid marks are defined from byte positions "0" to "95" in the old version DDS illustrated in FIG. 2, invalid marks may be configured to be defined and invalidated only for at least byte positions at which PSNs indicating DL recording positions and PSNs indicating recording start positions in a user data area. Further, the byte positions may be invalidated according to a method of, for example, shifting the old version DDS by, for example, predetermined bytes (for example, one byte), and inserting an invalid mark at the head of the DDS.

DESCRIPTION OF REFERENCE NUMERALS

101 SPINDLE MOTOR
102 PICK-UP
103 SERVO CIRCUIT
104 SIGNAL PROCESSING UNIT
105 SIGNAL INPUT/OUTPUT UNIT
106 SYSTEM CONTROL UNIT

The invention claimed is:

1. An information recording apparatus which records disc structure definition information for defining a structure of an optical disc, in management areas of the optical disc comprising a data area and the management areas positioned on an inner periphery side and an outer periphery side of the data area, the information recording apparatus comprising:

a memory which stores disc structure definition information of a new version comprising an invalid mark which cannot be interpreted as the disc structure definition information by an information reproducing apparatus and an information recording/reproducing apparatus being non-adaptive; and a recording control device which, when the disc structure definition information of the new version is recorded in the management areas, records the invalid mark and information common to disc structure definition information of an old version as the disc structure definition information of the new version, in an area comprising the management areas in which the disc structure definition information of the old version without the invalid mark needs to be recorded, and controls recording of the disc structure definition information of the new version such that the invalid mark is positioned at a position in the management areas in which at least position information indicating a recording start position of data in the data area and position information indicating a recording position of defect management information related to a defect of the optical disc, which are included in the disc structure definition information of the old version, need to be recorded.

2. The information recording apparatus according to claim 1,
wherein the invalid mark invalidates a byte position for recording the position information.

3. The information recording apparatus according to claim 1,
wherein the invalid mark fills a byte position for recording the position information, with 0.

4. An optical disc comprising a data area and management areas positioned on an inner periphery side and an outer periphery side of the data area and recording disc structure definition information for defining a structure of the optical disc,
wherein in the management areas, disc structure definition information of a new version comprising an invalid mark which cannot be interpreted as the disc structure definition information by an information reproducing apparatus and an information recording/reproducing apparatus being non-adaptive is recorded; and
the invalid mark and information common to disc structure definition information of an old version as the disc structure definition information of the new version are recorded in an area comprising the management areas in which the disc structure definition information of the old version without the invalid mark needs to be recorded, and the invalid mark is recorded at a position in the management areas in which at least position information indicating a recording start position of data in the data area and position information indicating a recording position of defect management information related to a defect of the optical disc, which are included in the disc structure definition information of the old version, need to be recorded.

5. An information reproducing apparatus which reproduces information recorded in the optical disc according to claim 1,
the information reproducing apparatus comprising:
an acquiring device which acquires the disc structure definition information of the new version comprising the invalid mark from the management areas of the optical disc; and
a reproduction control device which controls reproduction of the information based on the disc structure definition information except the invalid mark.

6. An information recording apparatus which records information in the optical disc according to claim 4,
the information recording apparatus comprising:
an acquiring device which acquires the disc structure definition information of the new version comprising the invalid mark from the management areas of the optical disc; and
a recording control device which controls recording of the information based on the disc structure definition information except the invalid mark.

7. An information recording method for recording disc structure definition information for defining a structure of an optical disc, in management areas of the optical disc comprising a data area and the management areas positioned on an inner periphery side and an outer periphery side of the data area,
the information recording method comprising:
a process of storing disc structure definition information of a new version comprising an invalid mark which cannot be interpreted as the disc structure definition information by an information reproducing apparatus and an information recording/reproducing apparatus being non-adaptive; and
a process of, when the disc structure definition information of the new version is recorded in the management areas, recording the invalid mark and information common to disc structure definition information of an old version as the disc structure definition information of the new version, in an area comprising the management areas in which the disc structure definition information of the old version without the invalid mark needs to be recorded, and controlling recording of the disc structure definition information of the new version such that the invalid mark is positioned at a position in the management areas in which at least position information indicating a recording start position of data in the data area and position information indicating a recording position of defect management information related to a defect of the optical disc, which are included in the disc structure definition information of the old version, need to be recorded.

8. A non-transitory recording medium in which an information recording/processing program is recorded, the information recording/processing program causing a computer which records disc structure definition information for defining a structure of an optical disc, in management areas of the optical disc comprising a data area and the management areas positioned on an inner periphery side and an outer periphery side of the data area, to:
store disc structure definition information of a new version comprising an invalid mark which cannot be interpreted as the disc structure definition information by an information reproducing apparatus and an information recording/reproducing apparatus being non-adaptive; and
when the disc structure definition information of the new version is recorded in the management areas, record the invalid mark and information common to disc structure definition information of an old version as the disc structure definition information of the new version, in an area comprising the management areas in which the disc structure definition information of the old version without the invalid mark needs to be recorded, and control recording of the disc structure definition information of the new version such that the invalid mark is positioned at a position in the management areas in which at least position information indicating a recording start position of data in the data area and position information indicating a recording position of defect management information related to a defect of the optical disc, which are included in the disc structure definition information of the old version, need to be recorded.

* * * * *